(12) United States Patent
Ogawa et al.

(10) Patent No.: US 6,296,996 B1
(45) Date of Patent: Oct. 2, 2001

(54) TRANSPARENT MAGNETIC RECORDING MEDIUM

(75) Inventors: Hiroshi Ogawa; Naohiro Matsunaga, both of Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/456,336

(22) Filed: Dec. 8, 1999

Related U.S. Application Data

(63) Continuation-in-part of application No. 09/084,890, filed on May 28, 1998, now abandoned.

(30) Foreign Application Priority Data

Jun. 3, 1997 (JP) .................................................. 9-145644

(51) Int. Cl.$^7$ ...................................................... G03C 1/76
(52) U.S. Cl. .......................... 430/523; 430/501; 430/496; 430/140; 428/694 BR; 428/694 BN; 428/694 BA
(58) Field of Search .................................... 430/523, 501, 430/496, 140; 428/694 BR, 694 BN, 694 BA

(56) References Cited

U.S. PATENT DOCUMENTS

| | | |
|---|---|---|
| 5,427,900 | 6/1995 | James et al. . |
| 5,432,050 | 7/1995 | James et al. . |
| 5,434,037 | 7/1995 | Wexler et al. . |
| 5,491,051 | 2/1996 | DeCory et al. . |
| 5,807,661 | 9/1998 | Landry-Coltrain . |
| 6,132,942 * | 10/2000 | Woodworth et al. ................. 430/496 |

FOREIGN PATENT DOCUMENTS

| | | |
|---|---|---|
| 0 177 939 | 10/1985 | (EP) . |
| 0 462 570 | 6/1991 | (EP) . |
| 64-37717 | 2/1989 | (JP) . |

* cited by examiner

*Primary Examiner*—Geraldine Letscher
(74) *Attorney, Agent, or Firm*—Burns, Doane, Swecker & Mathis, LLP

(57) ABSTRACT

There is disclosed a transparent magnetic recording medium having, on a support, at least one magnetic recording layer containing magnetic particles, which medium comprises a first set of protuberances having a height of 0.001 $\mu$m or more than 0.001 $\mu$m, but less than 0.1 $\mu$m, and a density of from $1\times10^2$ pieces/100 $\mu$m$^2$ to $1\times10^5$ pieces/100 $\mu$m$^2$, and a second set of protuberances having a height of from 0.1 $\mu$m to 0.5 $\mu$m, and a density of from 1 piece/100 $\mu$m$^2$ to 200 pieces/100 $\mu$m$^2$, on a surface that is at the side of said at least one magnetic recording layer provided, wherein the difference of height between the first set of protuberances and the second set of protuberances is 0.1 $\mu$m or more but 1.0 $\mu$m or less; and said medium contains at least first and second kinds of inorganic particles and/or organic high-molecular particles, each of which has different average primary particle diameters, in at least the magnetic recording layer or an outer layer positioned such that the magnetic recording layer lies between said outer layer and said support, the average primary particle diameter of the first kind of the inorganic particles and/or organic high-molecular particles used to obtain the second set of protuberances being more than 0.4 $\mu$m, but 1.5 $\mu$m or less. This transparent magnetic recording medium is assuredly capable of recording/reproducing various magnetic information, with little occurrence of magnetic error.

22 Claims, No Drawings

TRANSPARENT MAGNETIC RECORDING MEDIUM

This is a continuation-in-part application of U.S. patent application Ser. No. 09/084,890, filed on May 28, 1998, now abondoned.

FIELD OF THE INVENTION

The present invention relates to a transparent magnetic recording medium in which error in input/output (recording/reading) of the magnetic signal hardly occurs.

BACKGROUND OF THE INVENTION

A magnetic recording layer of a magnetic recording medium, such as an audiotape, a videotape, and a floppy disc, contains a high content (coating amount) of magnetic substance, which results in lack of light-permeability, even though high magnetic output (reading) capability can be attained. Consequently, the magnetic recording layer cannot be applied onto the printing surface of a magnetic card or onto a photographic film. U.S. Pat. No. 5,491,051 describes photographic elements that exhibit excellent magnetic and photographic characteristics, and that are capable of repeated use. A difficulty, however, arises for these photographic elements in that recording and reading of magnetic recording information, such as conditions at the time of development and printing, are not assured, as well as at the time of a repeat usage, incorporated with various information, such as the date of photographing, weather, conditions for illumination, conditions at the time of photographing (e.g. the ratio of reduction to enlargement), the number of leaves for reprinting, an area to be zoomed, and some messages. U.S. Pat. No. 5,807,661 describes photographic elements having a transparent magnetic recording layer which is improved in lubricity and durability. However, the photographic elements were not sufficient for the prevention of head staining and for magnetic input/output capacity.

Further, transparent magnetic layer-related techniques are described in JP-A-4-214217 ("JP-A" means unexamined published Japanese patent application), JP-A-6-161033, U.S. Pat. Nos. 5,496,687, 5,432,050, 5,436,120, and 5,434,037.

In fact, for example, when a magnetic recording medium is used as a photographic element (a photographic light-sensitive material), staining materials (processing deposits), which are, for example, composed of substances resulting from dryness of processing solutions in development, thickly adhere to a magnetic head, and thereby contact between the magnetic head and a magnetic layer is extremely deteriorated, which results in a so-called spacing loss. Further consequently, an error in reading of magnetic records from the magnetic recording medium easily arises. In order to clean up the stained head, abrasives are usually added to a magnetic layer. However, use of the abrasives in the manner hitherto known was not sufficient to prevent or remove the staining materials, which are composed of substances resulting from dryness of processing solutions in development, etc., from adhesion or transfer to the magnetic head. Further, when the amount of the abrasives to be added is too much, or the grain size of the abrasives is too large, a new problem arises that the transparency of the medium is too deteriorated for preferable use for photography, or the expected life span of the magnetic head is shortened. In view of the above, there is a need for the development of substantially transparent magnetic recording media that are assuredly capable of recording and reproducing magnetic information, with little occurrence of the above-mentioned problems.

SUMMARY OF THE INVENTION

Accordingly, an object of the present invention is to provide an excellent transparent magnetic recording medium that is assuredly capable of recording and reproducing various magnetic information, with little occurrence of magnetic error, even though the coating amount of the magnetic substance is reduced in order to ensure transparency thereof.

Other and further objects, features, and advantages of the invention will appear more fully from the following description.

DETAILED DESCRIPTION OF THE INVENTION

The above-mentioned object of the invention is attained by a magnetic recording medium having at least one magnetic recording layer containing magnetic particles on a support, which medium comprises protuberances having a height of 0.001 $\mu$m or more than 0.001 $\mu$m, but less than 0.1 $\mu$m, with their density being from $1 \times 10^2$ pieces/100 $\mu$m$^2$ to $1 \times 10^5$ pieces/100 $\mu$m$^2$, and also other protuberances having a height of from 0.1 $\mu$m to 0.5 $\mu$m, with their density being from 1 piece/100 $\mu$m$^2$ to 200 pieces/100 $\mu$m$^2$, on a magnetic recording medium surface at the side of the at least one magnetic recording layer; and by a silver halide photographic light-sensitive material comprising the above-described transparent magnetic recording layer.

Further, the object of the present invention is also attained by a transparent magnetic recording medium that has, on a support, at least one magnetic recording layer containing magnetic particles, wherein the medium comprising
a first set of protuberances having a height of 0.001$\mu$m or more than 0.001 $\mu$m, but less than 0.1 $\mu$m, and a density of from $1 \times 10^2$ pieces/100 $\mu$m$^2$ to $1 \times 10^5$ pieces/100 $\mu$m$^2$, and
a second set of protuberances having a height of from 0.1 $\mu$m to 0.5 $\mu$m, and a density of from 1 piece/100 $\mu$m$^2$ to 200 pieces/100 $\mu$m$^2$, on a magnetic recording medium surface that is at the side of said at least one magnetic recording layer provided, wherein the difference of height between the first set of protuberances and the second set of protuberances is 0.1 $\mu$m or more but 1.0 $\mu$m or less; and said medium containing
at least first and second kinds of inorganic particles and/or organic high-molecular particles, each of which has different average primary particle diameter,
in at least the magnetic recording layer or an outer layer positioned such that the magnetic recording layer lies between said outer layer and said support,
and the average primary particle diameter of the first kind of the inorganic particles and/or organic high-molecular particles used to obtain the second set of protuberances is more than 0.4 $\mu$m, but 1.5 $\mu$m or less.

Now, the present invention is described in detail.

Ingredients in processing solutions in development are divided, at the time of drying, by the protuberances having a height of 0.001 $\mu$m or more than 0.001 $\mu$m, but less than 0.1 $\mu$m, with their density being from $1 \times 10^2$ pieces/100 $\mu$m$^2$ to $1\times10^5$ pieces/100 $\mu m^2$ (hereinafter, the protuberances may be referred to as "shorter (or small) protuberances."), for use in the present invention, and then the dried solid materials of the ingredients are finely divided. After that, the resultant finely divided stains from processing solutions are hardly adhered to a magnetic head, owing to the protuberances having a height of from 0.1 $\mu m$ to 0.5 $\mu m$, with their density being from 1 piece/100 $\mu m^2$ to 200 pieces/100 $\mu m^2$ (hereinafter, the protuberances may be referred to as "taller (or large) protuberances."), which results in substantially no magnetic error.

The density of the protuberances having a height of 0.001 $\mu m$ or more than 0.001 $\mu m$, but less than 0.1 $\mu m$, according to the present invention, is preferably 100 pieces/100 $\mu m^2$ or more, and particularly preferably 500 pieces/100 $\mu m^2$ or more. The upper limit of the number of these protuberances is substantially about $1\times10^5$/100 $\mu m^2$.

Further, the density of the protuberances having a height of from 0.1 $\mu m$ to 0.5 $\mu m$ is from 1 piece/100 $\mu m^2$ to 200 pieces/100 $\mu m^2$, preferably from 5 pieces/100 $\mu m^2$ to 100 pieces/100 $\mu m^2$, and particularly preferably from 7 pieces/100 $\mu m^2$ to 70 pieces/100 $\mu m^2$.

In order to further reduce head stain, and thereby to reduce magnetic error, it is preferable to regulate the height of the protuberances, so that a difference in height between the taller protuberances and the shorter protuberances is about 0.05 $\mu m$ or more, preferably from 0.1 $\mu m$ to 1.0 $\mu m$, more preferably from 0.3 $\mu m$ to 1.0 $\mu m$, and particularly preferably from 0.5 $\mu m$ to 1.0 $\mu m$.

In the transparent magnetic recording medium of the present invention, it is necessary to keep a slight space of about 0.1 $\mu m$ to about 0.5 $\mu m$, even when pressure is applied to a magnetic head. Stain is hardly adhered to the magnetic head, owing to this slight space. Consequently, magnetic output is not reduced by the spacing loss that is caused by head stain, whereby stable magnetic recording/reproduction performance is attained.

It was found that the state of contact of a magnetic layer with the head with respect to the taller protuberances' height is preferably not more than 70%, in terms of fractional contact area, under a load of 16 kgf/cm² (25° C., 60%RH), at the wavelength of 0.5 $\mu m$. A fractional contact area of not more than 60% is particularly preferred. The lowest limit of the fractional contact area is about 20% or more from the point of a magnetic output.

The surface shape of the transparent magnetic recording medium of the present invention can be obtained by containing at least two kinds of inorganic particles and/or organic high-molecular particles, whose average primary particle diameters are different from each other, in a transparent magnetic recording layer and/or an outer layer positioned outer than the said transparent magnetic recording layer. The term "at least two kinds" means to include the case of the same material but for different particle diameters, in addition to the case of different materials and for different particle diameters.

Hereinbelow, the two kinds of particles mentioned above are, in some cases, referred to as first and second kinds of particles.

Preferably, the average primary particle diameter of at least one of inorganic particles and/or organic high-molecular particles, whose average primary particle diameters are different from each other, is from 0.01 $\mu m$ to 0.2 $\mu m$, and that of the other particles is more than 0.4 $\mu m$, but 1.5 $\mu m$ or less, because the surface shape according to the present invention can be relatively easily obtained when the average primary particle diameters of the at least two kinds of particles are satisfied by the above-described relation.

More preferably, the average primary particle diameter of the larger particles is 0.7 $\mu m$ or more, but 1.5 $\mu m$ or less.

Further, a combination of particles whose average primary particle diameter is from 0.01 $\mu m$ to 0.1 $\mu m$, and other particles whose average primary particle diameter is from 0.5 $\mu m$ to 1.5 $\mu m$, exhibits a considerable effect to prevent the magnetic error caused by head stain. Most preferred is a combination of particles whose average primary particle diameter is 0.01 $\mu m$ or more, but less than 0.04 $\mu m$, and other particles whose average primary particle diameter is from 0.5 $\mu m$ to 1.0 $\mu m$. Still more preferably, the diameter of the smaller particles for this combination is not more than 0.03 $\mu m$.

Herein, the particles smaller in particle diameter may be referred to as "small particles," and the particles larger in particle diameter as "large particles."

When the average primary particle diameter is greater than 1.5 $\mu m$, or the height of a protuberance on the surface of a magnetic layer is higher than 0.5 $\mu m$, problems arise that, in the case of the use as a silver halide photograph, haze significantly appears, or granularity of the photograph reduces, or protuberances located at the surface damage (hurt) the surface of the photosensitive silver halide emulsion layer, or a magnetic reproduction output falls.

Examples of inorganic particles for obtaining the surface protuberances according to the present invention include oxides, such as aluminum oxides ($\alpha$-alumina, $\gamma$-alumina, corundum, etc.), chromium oxide ($Cr_2O_3$), iron oxide ($\alpha$-$Fe_2O_3$), silica, colloidal silica, titanium dioxide, zinc oxide, and tin oxide; carbides, such as silicon carbide (SiC) and titanium carbide; fine powder of diamond etc.; calcium carbonate, aluminum hydroxide, barium sulfate, strontium barium sulfate, and manganese colloid.

Examples of organic high-molecular particles that are preferably spherical, include resin particles, such as methacryl resin, polystyrene, polysiloxane, melamine resin, benzoguanamine resin, polytetrafluoroethylene, cellulose acetate, polycarbonate, and polyamide (nylon); and starch. Preferred of these materials are poly(methyl methacrylate) (PMMA), polysiloxane, polystyrene, melamine resin, and guanamine resin.

Alternatively, the organic high-molecular particles may be particles finely grained by various means, such as suspension polymerization, a spray-dry method, or a dispersion method, using a homopolymer or a copolymer derived from a single monomer, or at least two kinds of monomers, such as acrylic acid esters, methacrylic acid esters, itaconic acid diesters, crotonic acid esters, mareic acid diesters, phthalic acid diesters, styrene derivatives, vinyl esters, acryl amides, vinyl ethers, allyl compounds, vinyl ketones, vinyl heterocyclic compounds, acrylonitrile, methacrylonitrile, and multi-functional monomers.

Preferable particles whose average primary particle diameter is from 0.01 $\mu m$ to 0.2 $\mu m$, are $\alpha$-alumina, $\gamma$-alumina, $\theta$-alumina, titanium dioxide particles, silica, colloidal silica, polystyrene, and/or PMMA. In the present invention, these small particles are used to form minute protuberances on the surface of a magnetic layer, and therefore, other particles besides the above-mentioned preferred particles can be used in order to attain the object of the present invention. Specific examples of the small particles are illustrated below.

($\alpha$-alumina)
"HIT 100", "HIT 80", "HIT 80 G", "AKP 80", and "AKP 50" (trade names), all of which are manufactured by Sumitomo Chemical Co., Ltd.

($\gamma$-alumina)
"AKP-G015" (trade name) manufactured by Sumitomo Chemical Co., Ltd.

(θ-alumina)
"AKP-G008" (trade name) manufactured by Sumitomo Chemical Co., Ltd.
(Titanium dioxide)
"Idemitsu Titania" (trade name) manufactured by Idemitsu Petrochemical Co., Ltd.
(Silica)
"Seahostar KEP 10" (trade name) manufactured by Nippon Shokubai Co., Ltd.
(Colloidal silica)
"MEK-ST", "MIBK-ST", "Methanol Silica Sol", "MA-ST-M", and "IPA-ST" (trade names), all of which are manufactured by Nissan Chemical Industries, Ltd.
(PMMA)
"MS-300K" and "MS-300S" (trade names), both of which are manufactured by Soken Chemical & Engineering Co., Ltd.; "P-8000", "S-5002", and "P-5002" (trade names), all of which are manufactured by Nippon Paint Co., Ltd.
(Polystyrene)
"S 5001", "P-5001" (trade names), both of which are manufactured by Nippon Paint Co., LTD.

Preferably, the shape of the large particles, whose average primary particle diameter is more than 0.4 µm, but 1.5 µm or less, is spherical. Further, preferably the particle size distribution is sharp, because pressure dispersion can be applied under the pressure, so that the contact area with the head can be minimized.

The large particles, whose average primary particle diameter is more than 0.4 µm, but 1.5 µm or less, are preferably inorganic particles and/or organic high-molecular particles selected from silica, polysiloxane particles, methacryl resin particles, and melamine resin particles.

When silica is used, a combination of organic high-molecular particles therewith is preferred, from a viewpoint of preventing damage to an emulsion surface. As such the large particles, the use of the organic high-molecular particles is particularly preferred from viewpoints of uniformity of the shape and preventing damage to an emulsion surface.

Specific examples of the large particles are illustrated below, but the present invention is not limited to these materials. Hereinafter, the words and numbers enclosed in quotation marks each indicate a trade name.
(Silica)
"Seahostar KEP 30," "Seahostar KEP 50," "Seahostar KEP 70," "Seahostar KEP 90," "Seahostar KEP 100," and "Seahostar KEP 150," all of which are manufactured by Nippon Shokubai Co., Ltd.
(Siloxane)
"Tospearl 105," "Tospearl 108," and "XC99-A8808," all of which are manufactured by Toshiba Silicone Co., Ltd.
(PMMA)
"MX-100" and "MX-150," both of which are manufactured by Soken Chemical & Engineering Co., Ltd.; "P-1430" and "P-5000", both of which are manufactured by Nippon Paint Co., LTD.
(Melamine resin)
"Epostar S12" and "Epostar S6," both of which are manufactured by Nippon Shokubai Co., Ltd.

The use of abrasives, particularly α-alumina, in addition to the large particles and the small particles, is particularly preferred to give a head-cleaning property (ability to clean a head). Preferably, α-alumina is used in combination with the other particles, in a weight ratio ranging from 5:95 to 95:5. Such a ratio of the combination use can be adjusted according to the amount desired for the head-cleaning (or the amount of abrasion of a head).

Further, the average particle size of α-alumina is preferably not more than about 120% of that of the other large particles to be used in combination therewith, because the amount of abrasion of a head does not increase excessively.

The average primary particle size of α-alumina to be used as an abrasive is preferable 0.1 to 1.0 µm, and more preferably 0.5 to 1.0 µm.

Specific examples of α-alumina are illustrated below.
"AKP 30," "AKP 20," "AKP 15," "AKP 10," "Sumicorundum," and "HIT 50," all of which are manufactured by Sumitomo Chemical Co., Ltd.; "ERC-DBM," manufactured by Reynolds Co., Ltd., and "Norton-E 600," manufactured by Norton Co., Ltd.

The thickness of a magnetic recording layer is generally from 0.3 µm to 1.5 µm, and preferably from 0.5 µm to 1.2 µm.

When a transparent matte layer is superimposed on the magnetic recording layer, the thickness of the magnetic recording layer is generally from 0.3 µm to 1.4 µm, and the thickness of the transparent matte layer is generally from 0.01 µm to 0.5 µm.

When the large particles and the small particles are incorporated only in the magnetic recording layer, preferably, the amount of the small particles to be added is from 50 mg/m$^2$ to 300 mg/m$^2$, and that of the large particles is from 5 mg/m$^2$ to 50 mg/m$^2$, based on a thickness of 1.0 µm.

Further, when a transparent matte layer is superimposed on the magnetic recording layer, and the large particles and the small particles are incorporated in the transparent matte layer, preferably, the amount of the small particles to be added is from 10 mg/m$^2$ to 50 mg/m$^2$, and the amount of the large particles to be added is from 5 mg/m$^2$ to 20 mg/m$^2$, based on a thickness of 1.0 µm.

It is preferable to add thereto particles whose average primary particle diameter is large (the particles for forming coarse protuberances), so that the fractional contact area will be not more than 70%, when measured at 0.5 µm of wavelength of the transparent magnetic recording medium under the condition of 25° C. 60%RH and a load of 16 kgf/cm$^2$. A measurement of the fractional contact area is described below. Adding an amount that makes the fractional contact area exceed about 70% is not preferable, because processing stain on the magnetic layer is easily transferred to a magnetic head. On the other hand, adding an amount that makes the fractional contact area lower than 20% is not so preferable, because the space loss of the magnetic input/output is enlarged, and thereby the output is lowered.

Thus, in order to obtain a magnetic layer whose fractional contact area is small, preferably a layer containing the large particles and the small particles is superimposed as a transparent matte layer, on (the outer side of) the magnetic layer, or alternatively these particles may be added to other separate layer(s). In the case of multiple layers, preferably the large particles and the small particles are simultaneously added to each of the layers, or alternatively different particles are added to each of the layers, in order to attain the object of the present invention. Further, the thickness of the layer containing both the large particles and the small particles is preferably adjusted to not more than 90%, and particularly preferably not more than 80%, of the large particle diameter.

Further, the thickness of the layer containing the inorganic particles and/or organic high-molecular particles is preferably adjusted to 50% or more, but 90% or less of the average particle diameter of particles having the largest average particle diameter.

A transparent matte layer may contain inorganic particles and/or organic high-molecular particles, with the preferable addition amount thereof being from $1\times10^{-12}$ mg/$\mu$m$^3$ to $3\times10^{-10}$ mg/$\mu$m$^3$.

Further, preferably, 90% or more of the number of particles (including secondary particles) that exist in a coated layer have a particle size of not more than 1.0 $\mu$m. More preferably, 95% or more of the particles are of this size (1.0 $\mu$m or less). This is because such particles can extremely uniformly contact a magnetic head, and they also eliminate the need for such post-processing steps as calendering (mirror surface processing). Preferably, these particles are dispersed singly or in combination to form a slurry, and the resultant slurry is added to a coating solution for a layer to be incorporated therewith, and then they are mixed, thereby giving a wide formulation range for consideration of such as the storage stability of a coating solution.

Further, a part or all of a coating solution solvent for a layer containing said inorganic or/and organic high-molecular particles can be charged by a solvent that is capable of dissolving a layer positioned under the above-said layer. Consequently, a part of the under layer is dissolved with the solvent at the time of coating the said layer containing these particles, whereby the particles are buried in a part of the under layer. It is particularly effective to superimpose the said particle-containing layer as a separate layer on the outer side of a magnetic layer. At this time, preferably not less than 50% in volume of individual particles is buried in the layer, because the particles are prevented from falling off. More preferably, not less than 60% of individual particles is buried therein.

The refractive index of the particles for use in the present invention is not particularly limited. However, a difference in the refractive index of the particles to that of the layer containing the particles is preferably not more than 0.08, more preferably not more than 0.04, and still more preferably not more than 0.02, from the point that transparency of the medium, such as haze, can be improved.

Preferably, inorganic particles and organic high-molecular particles for use in the present invention are subjected to known surface treatments, for the purpose of improvements in dispersibility of particles in a dispersion solution, aggregate sedimentation, durability (preventing the particles from falling off, etc.), running property, and the like. Examples of the surface treatment include a silane coupling agent, a titanium coupling agent, and an aluminum coupling agent, as described in, for example, German Patent 2653723, JP-A-4-251429, JP-A-2-73513, JP-A-49-59608, JP-A-59-107426, JP-A-62-202327, and JP-B-6-180746 ("JP-B" means examined Japanese patent publication), JP-A-61-77136, U.S. Pat. No. 4,584,243, JP-A-7-73442, and JP-B-5-8592; coating with a polymer, as described in, for example, JP-A-1-162223 and JP-A-6-80406; and coating with a solid acid, as described in JP-B-6-73176. Further, inorganic particles and organic high-molecular particles for use in the present invention can be dispersed in the same dispersion method (dispersion device, etc.) as for the magnetic substance described later.

When a magnetic recording medium of the present invention is superimposed on a photographic film, the degree of haze of all layers coated on the side of a magnetic recording layer is preferably less than 9%, and more preferably less than 8%. At this time, the average size of magnetic particles is preferably from 0.03 $\mu$m to 0.35 $\mu$m. The transparent magnetic recording layer means a magnetic recording layer that exhibits transparency on a level that does not substantially affect the photographic image quality. Further, the transparent layer herein referred to generally provides 0 to 0.2, preferably from 0 to 0.15, and more preferably from 0 to 0.10, in terms of blue-filter transmission density.

Examples of magnetic grains that can be contained in a transparent magnetic recording layer for use in the present invention include ferromagnetic iron oxide, such as $\gamma$-Fe$_2$O$_3$ (FeO$_x$, 4/3<x$\leq$3/2), Co-coated ferromagnetic iron oxide, such as Co-coated $\gamma$-Fe$_2$O$_3$ (FeO$_x$, 4/3<x$\leq$3/2), Co-coated magnetite, and further Co-doped ferromagnetic iron oxide, Co-doped magnetite, ferromagnetic chromium dioxide, ferromagnetic metal, ferromagnetic alloy, and other magnetites and ferrites, e.g. hexagonal system Ba ferrite, Sr ferrite, Pb ferrite, and Ca ferrite, and a solid solution of these substances or ion substitutes of these substances.

The shape of the ferromagnetic substance may be any of an acicular shape (needle-like shape), a rice-grain-like shape, a spherical shape, a cubic shape, and a plate-like shape. Among these, a needle-like ferromagnetic substance is preferred from a viewpoint of electromagnetic conversion characteristics. Turning to the particle size, when the magnetic substance is needle-like, the particle size (the length of the longer axis) is preferably from 0.01 $\mu$m to 0.5 $\mu$m, and the ratio of the longer axis to the shorter axis is preferably from 50:1 to 2:1, and more preferably the length of the longer axis is from 0.1 $\mu$m to 0.35 $\mu$m, and the ratio of the longer axis to the shorter axis is from 20:1 to 3:1. The specific surface area of the particle is preferably not less than 30 m$^2$/g, and particularly preferably not less than 40 m$^2$/g, in terms of $S_{BET}$. The particle size distribution of the magnetic substance is preferably as sharp as possible, from viewpoints of magnetic property and haze. The saturation magnetization ($\sigma$s) of the ferromagnetic substance is preferably not less than 50 emu/g, and more preferably not less than 70 emu/g. Further, the rectangularity (squareness) ratio ($\sigma$r/$\sigma$s) of the ferromagnetic substance is preferably not less than 40%, and more preferably not less than 45%. The coercive force (Hc) is generally from 200 Oe to 3000 Oe, and preferably from 500 Oe to 2000 Oe.

The content of the magnetic particles in a magnetic recording layer is preferably from 10 mg/m$^2$ to 100 mg/m$^2$, from a viewpoint of the balance between magnetic reading power (efficiency) and transparency.

These ferromagnetic particles may be subjected to surface treatment with silica and/or alumina, as those described in, for example, JP-A-59-23505 and JP-A-4-096052. Alternatively, they may be subjected to surface treatment with inorganic and/or organic material, as described, for example, in JP-A-4-195726, JP-A-4-192116, JP-A-4-259911, and JP-A-5-081652. Further, the surface of these ferromagnetic particles may be treated with a silane coupling agent or a titanium coupling agent. Specific examples of the silane coupling agent to be used include 3-mercaptopropyl trimethoxysilane, 3-isocyanylpropyl methyldimethoxysilane, 3-(poly(degree of polymerization 10)oxyethynyl)oxypropyl trimethoxysilane, 3-methoxy (poly (degree of polymerization 6) oxyethynyl)oxypropyl trimethoxysilane, and decyltrimethoxy silane. The amount of these silane coupling agents and titanium coupling agents to be added to the magnetic particles is generally from 1.0 to 200 wt%, preferably from 1 to 75 wt%, and more preferably from 2 to 50 wt%. Further, these silane coupling agents and titanium coupling agents may be treated according to a direct processing method for the magnetic particles, or alternatively an integral blend method. The direct processing method is a general term (name) for a dry process, a slurry process (method), and a spray process (method). A preferable embodiment according to the dry process is that magnetic particles and a small amount of water or an organic solvent, or magnetic particles and an organic solvent containing water, and a coupling agent are mixed, and then the water and/or the organic solvent are removed from the resultant mixture by means of an open kneader with stirring, followed by fine dispersion.

Preferred among methods of dispersing the above-described magnetic substance in a binder (hereinafter described), are a kneader, a pin-type mill, and an annular-type mill, and the like. The combined use of a kneader and a pin-type mill, or the combined use of a kneader and an annular-type mill, is also preferred. The kneader is a general term (name) for open-type, closed-type, and continuation (succession)-type kneaders. Alternatively, other kneaders, such as a three roll mill and a laboplastmill, can also be used. A dispersion by means of a micro fluidizer is also preferably applied.

The thickness of a magnetic recording layer is generally not more than 3 μm, preferably not more than 1.5 μm, and more preferably not more than 1.0 μm. The coercive force of the magnetic recording layer is generally from 500 Oe to 3000 Oe, and preferably from 800 Oe to 1500 Oe.

A magnetic recording layer for use in the present invention can be provided with a stripe pattern, or the layer is provided all over the surface, on the back surface of the photographic support. The magnetic recording layer, having been coated on a support, is subjected to a processing for orientation, during the drying of magnetic materials in the layer instantly after the coating, if necessary, and then the resulting magnetic recording layer is dried. Methods of using a permanent magnet or a solenoid coil can be used for orientation of the magnetic substance. The strength of the permanent magnet is preferably not less than 2000 Oe, and particularly preferably not less than 3000 Oe. On the other hand, the strength of the solenoid coil may be 500 Oe or more. Further, the timing of the orientation at the drying step is preferably a specific point at which an amount of the solvent remaining in a magnetic recording layer reaches the range of from 5% to 70%.

A binder for layers, including a magnetic recording layer, for use in the present invention is described below. The following can be used as the binder for use in the present invention: thermoplastic resins, thermosetting resins, reactive-type resins; polymers having an acid or alkali decomposability, or a biodegradability; natural polymers (e.g. cellulose derivatives, sugar derivatives), and a mixture thereof. The glass transition temperature, Tg, of the above resins is preferably from −40° C. to 300° C., and the weight-average molecular weight is preferably from 2,000 to 1,000,000, more preferably from 5,000 to 300,000.

Further, among binders that constitute a magnetic recording layer, cellulose esters whose substitution degree is from 1.7 to 2.9, are preferably used. Cellulose diacetate, cellulose acetate butylate, and cellulose acetate propionate are particularly preferred.

The following polar group may be introduced into the above-listed binder: an epoxy group, $CO_2M$, OH, $NR_2$, $NR_3^+X^-$, $SO_3M$, $OSO_3M$, $PO_3M_2$, or $OPO_3M_2$, wherein M represents a hydrogen atom, an alkali metal, or an ammonium, with the proviso that when the group contains two or more Ms, they are the same or different; R represents a hydrogen atom or an alkyl group, and X represents a halide ion.

The above-listed binders may be used singly or in a mixture thereof, and they may contain crosslinking agents such as epoxy-, aziridine-, and isocyanate-series crosslinking agents. By using crosslinking agents, it is possible to strengthen the adhesion of layer itself or adhesion between layers. The isocyanate-series crosslinking agents are polyisocyanate compounds having two or more isocyanate groups, with examples including isocyanates, such as tolylene diisocyanate, hexamethylene diisocyanate, xylylene diisocyanate, naphthalene-1,5-diisocyanate, o-toluidine diisocyanate, isophorone diisocyanate, and triphenylmethane diisocyanate; reaction products of these isocyanates and polyalcohols (e.g. a reaction product of tolylene diisocyanate (3 mol) and trimethylol propane (1 mol)); and polyisocyanates produced by the condensation of these isocyanates. Among the above crosslinking agents, isocyanate-series crosslinking agents represented by the following general formula (1) are particularly preferable. general formula (1):

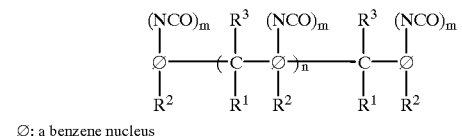

⊘: a benzene nucleus

In the general formula (1), n is preferably in the range of 1 to 50, more preferably from 0 to 30, and further preferably from 0 to 10. The number of n is not necessarily single, but may have a distribution. φ represents a benzene ring. m is an integer of 1 or 2. $R^1$, $R^2$, and $R^3$ each represent a hydrogen atom, an alkyl group having 1 or more, preferably 1 to 12, more preferably 1 to 4 carbon atoms, or an aryl group having 6 or more, preferably 6 to 12 carbon atoms.

The viscosity of the crosslinking agent is preferably from 50 (cP/25° C.) to 1000 (cP/25° C.). Further, the NCO content of the crosslinking agent is preferably from 20 to 40%, and more preferably from 25 to 35%. Examples of commercially available products of the crosslinking agent include "Millionate MT," "Millionate MR-100," "Millionate MR-200," "Millionate MR-300," and "Millionate MR-400" (trade names, manufactured by Japan Polyurethane Co., Ltd.), and "Sumidur 44V10" (trade name, manufactured by Sumitomo Bayer Urethane Co., Ltd.).

The coating amount of the above crosslinking agent is preferably from 3 mg/m² to 1000 mg/m², more preferably from 5 mg/m² to 500 mg/m², and further preferably from 10 mg/m² to 300 mg/m². In order to complete bridge formation using the crosslinking agent, it is preferable to heat and dry at 50° C. or more, more preferably 70° C. or more, for 1 min to 72 hrs.

When use is made of the above crosslinking agent, in combination with at least one of a tertiary amine-series, a metal salt-series, and a DBU (1,8-diaza-bicyclo[5,4,0] undecene-7)-series compound at the same time, is able to accelerate the crosslinking reaction speed of the layer per se (the layer containing the crosslinking agent), or between the layer and a layer adjacent therewith, whereby the crosslinking reaction time for improvement of durability can be shortened. The amount to be added of the above tertiary amine-series, metal salt-series, or DBU-series compound is generally a catalytic amount, for example, an amount in the order of several percents of the crosslinking agent to be used. Examples of the tertiary amine-series compound include tetramethylbutanediamine, 1,4-diazabicyclo[2,2,2] octane, and triethylamine, as described by Bruins et al., in *Polyurethane Technology*, p.25, Interscience (1960). Further, examples of the metal salt-series compound include dibutyltin dilaurate, tin caprylate, cobalt naphthenate, stannous chloride, tetra-n-butyl tin, stannic chloride, trimethyl tin hydroxide, and dimethyl tin dichloride. These compounds may be added, for example, to a coating solution for a magnetic recording layer, in combination with the above crosslinking agent, followed by coating the thus-obtained coating solution onto a support. Additionally, or alternatively, these compounds may be added to a coating solution for an under layer and/or an upper layer to be coated below or above a magnetic recording layer, so that these compounds can be diffused to the magnetic recording layer.

Examples of the film support for use in the present invention include triacetylcellulose (TAC), polyamides, polycarbonates, and polyesters. Preferred materials are polyesters. The preferable average molecular weight of these polyesters is within the range of about 5,000 to 200,000. Of these polyesters for use in the present invention, preferred are those having a glass transition temperature (Tg) in the range of generally from 70° C. to 170° C., preferably from 90° C. to 150° C. Specific examples of polyesters that can be used in the present invention include the following compounds.

Examples of Polyester Compounds

P-1: [Terephthalic acid (TPA)/Ethylene glycol (EG) (100/100)] (PET) Tg=80° C.

P-2: [2,6-Naphthalenedicarboxylic acid (NDCA)/Ethylene glycol (EG) (100/100)] (PEN) Tg=119° C.

P-3: 2,6-NDCA/TPA/EG (50/50/100) Tg=92° C.

P-4: PEN/PET (60/40) Tg=95° C.

P-5: PEN/PET (80/20) Tg=104° C.

Preferable polyesters are those containing as a constituting member 2,6-naphthalenedicarboxylic acid, in which 2,6-naphthalenedicarboxylic acid is contained in an amount of 10 mol% or more of all dicarboxylic acids in constituting members. Polyethylene-2,6-naphthalenedicarboxylate is particularly preferred of all. Further, the thickness of a support is preferably from 80 $\mu$m to 115 $\mu$m, and particularly preferably from 85 $\mu$m to 105 $\mu$m. Further, a polyester support, prior to coating a light-sensitive layer thereon, may be subjected to heat treatment at a temperature ranging from 40° C. to glass transition temperature, for a period of from 0.1 to 1500 hours, whereby core-set curl can hardly occurs for the roll-formed light-sensitive material.

A plasticizer, such as triphenyl phosphate, biphenyldiphenyl phosphate, and dimethylethyl phosphate, is usually added in TAC support. The support may contain a dye for various purposes of neutralization of base coloring, light-piping prevention, and antihalation. These supports may be subjected to a surface treatment, in order to achieve strong adhesion between the support and a photographic constituting layer (e.g. a light-sensitive silver halide emulsion layer, an interlayer, a filter layer, a magnetic recording layer, an electrically conductive layer), and then a photographic emulsion is coated directly onto the support. For the above-mentioned surface treatment, various surface-activation treatments can be used, such as a chemical treatment, a mechanical treatment, a corona discharge treatment, a flame treatment, an ultraviolet ray treatment, a high-frequency treatment, a glow discharge treatment, an active plasma treatment, a laser treatment, a mixed acid treatment, and an ozone oxidation treatment. Alternatively, once the support is subjected to the above-described surface treatment, or if the surface treatment is omitted, then a subbing layer may be coated on the support, followed by a coating of a photographic emulsion layer on the subbing layer. These surface treatments can be conducted according to the known methods.

Further, a transparent magnetic recording medium of the present invention may contain other additives, such as a dye and a surfactant. Further, a silicon-series compound and/or a fluorine-series compound (a fluorine-containing compound) are preferably incorporated in at least one of layers on the side of the transparent magnetic recording layer of a transparent magnetic recording medium of the present invention. This is because stain (deposit) hardly adheres to the surface of the medium, and consequently stain hardly transfers to a magnetic head, which results in less magnetic input/output trouble. Specific examples of these compounds include FC-431 (trade name, manufactured by Sumitomo 3M Co., Ltd.). Preferable examples of a lubricant (a sliding agent) for use in a transparent magnetic recording medium of the present invention are higher fatty acid esters (esters of a fatty acid having 10 to 24 carbon atoms and an alcohol having 10 to 60 carbon atoms). The amount of the lubricant to be used is preferably from 0.001 to 0.1 g/m$^2$, and more preferably from 0.005 to 0.05 g/m$^2$.

Preferred examples of the magnetic recording media according to the present invention include a color reversal film and a color nega film, both of which contain a light-sensitive silver halide layer. Amateur color nega films are particularly preferred. The silver halide photographic light-sensitive material of the present invention has the prescribed protuberances on a surface at the side of the magnetic recording layer provided, and preferably has at least one light-sensitive silver halide emulsion layer on one side of a support, which side is opposed to the other side of the support on which the transparent magnetic recording layer is provided. The silver halide emulsion is generally subjected to physical ripening, chemical ripening, and spectral sensitization, for practical use. The present invention particularly exhibits its effects when an emulsion sensitized with both a gold compound and a sulfur-containing compound is used. Additives that can be used in these steps are described in Research Disclosure Nos. 17643 and 18716, and the corresponding passages are listed below.

Known photographic additives that can be used in present invention are also described in the above-mentioned two Research Disclosures, and involved sections are listed in the same Table below.

| Kind of Additive | RD 17643 | RD 18716 | |
|---|---|---|---|
| 1 Chemical sensitizers | p. 23 | p. 648 | (right column) |
| 2 Sensitivity-enhancing agents | — | p. 648 | (right column) |
| 3 Spectral sensitizers and Supersensitizers | pp. 23–24 | pp. 648–649 | (right column) (right column) |
| 4 Brightening agents | p. 24 | | |
| 5 Antifogging agents and Stabilizers | pp. 24–25 | p. 649 | (right column)~ |
| 6 Light absorbents, Filter dyes and Ultraviolet absorbents | pp. 25–26 | p. 649–650 | (right column) (left column) |
| 7 Stain-preventing agents | p. 25 (right column) | p. 650 | (left to right column) |
| 8 Color-image stabilizers | p. 25 | | |
| 9 Film hardeners | p. 26 | p. 651 | (left column) |
| 10 Binders | p. 26 | p. 651 | (left column) |
| 11 Plasticizers and Lubricants | p. 27 | p. 650 | (right column) |
| 12 Coating aids and Surface-active agents | pp. 26–27 | p. 650 | (right column) |

According to the present invention, a transparent magnetic recording medium that is excellent in both assured magnetic input/output capability (capacity) and transparency, can be provided.

The present invention is described in more detail with reference to the following examples, but the present invention is not limited thereto.

EXAMPLES

1) First Layer and Subbing Layer

A glow discharge treatment was conducted to both surfaces of a polyethylene naphthalate support of 90 μm thickness at the conditions of processing atmosphere pressure, 0.2 Torr; $H_2O$ partial pressure in atmosphere, 75%; discharge frequency, 30 kHz; output, 2500 W; and processing strength, 0.5 kV·A·min/m². A coating solution having the formulation shown below was coated, as the first layer, onto the above-said support, in a coated amount of 5 cc/m², according to the bar method described in JP-B-58-4589.

| Formulation | |
|---|---|
| Dispersion of electrically conductive fine particles (aqueous dispersion having 10% density of $SnO_2/Sb_2O_5$ particles. Secondary aggregate, whose average particle diameter was 0.05 μm, composed of particles whose primary particle diameter was 0.005 μm.) | 50 weight parts |
| Gelatin | 0.5 weight part |
| Water | 49 weight parts |
| Polyglycerol polyglycidyl ether | 0.16 weight part |
| Polyoxyethylene sorbitan mono-laurate (polymerization degree 20) | 0.1 weight part |

Further, after the first layer was coated on the support, the resultant support was wound round a stainless reel 20 cm in diameter, followed by heat treatment at 110° C. (Tg of the PEN support: 119° C.) for 48 hours, in order to give the support thermal history and subject it to an anneal treatment. Subsequently, a coating solution having the formulation shown below, was coated using a bar coating, in a coating amount of 10 cc/m², as a subbing layer for an emulsion, opposite to the surface of the support having coated thereon the first layer.

| | |
|---|---|
| Gelatin | 1.01 weight part |
| Salicylic acid | 0.30 weight part |
| Resorcin | 0.40 weight part |
| Poly(polymerization degree 10)oxyethylene nonylphenylether | 0.11 weight part |
| Water | 3.53 weight parts |
| Methanol | 84.57 weight parts |
| n-Propanol | 10.08 weight parts |

Further, the second layer and the third layer as described below were successively coated on the first layer, and finally a color nega light-sensitive material described in Example 1 of JP-A-7-287345, was multi-layer coated on the opposite side, to prepare a transparent magnetic recording medium having a silver halide emulsion layer.

2) Second Layer (Transparent Magnetic Recording Layer)

[1] Dispersion of Magnetic Substance

To an open kneader, 1100 weight parts of Co-coated γ-$Fe_2O_3$ magnetic substance (average length of the longer axis, 0.25 μm; $S_{BET}$, 39 m²/g; Hc, 831 Oe; σs, 77.1 emu/g; σr, 37.4 emu/g), 220 weight parts of water, and 165 weight parts of the silane coupling agent [3-poly(polymerization degree 10)oxyethynyl)oxypropyl trimethoxysilane] were added, and this mixture was well kneaded for 3 hours. The thus coarsely dispersed viscous solution was dried at 70° C. for 24 hours, to remove water. After that, the resultant dry powder was further subjected to heat treatment at 110° C. for 1 hour, to prepare surface-treated magnetic particles.

Further, a mixture having the following formulation was again kneaded in an open kneader for 4 hours:

| | |
|---|---|
| The above-described surface-treated magnetic particles | 855 g |
| Diacetyl cellulose | 25.3 g |
| Methyl ethyl ketone | 136.3 g |
| Cyclohexanone | 136.3 g |

Further, a mixture having the following formulation was finely dispersed by means of a sand mill (¼ G), at the rate of 2000 rpm, for 4 hours. As a media, glass beads having a diameter of 1 mmφ were used.

| | |
|---|---|
| The above-described kneaded solution | 45 g |
| Diacetyl cellulose | 23.7 g |
| Methyl ethyl ketone | 127.7 g |
| Cyclohexanone | 127.7 g |

Further, a coating solution having the following formulation was prepared for the third layer.

[2] Preparation of Magnetic Substance-containing Intermediate Solution

The above-described magnetic substance

| | |
|---|---|
| The above-described magnetic substance finely dispersed solution | 50.8 g |
| Diacetyl cellulose solution (solid content 4.5%, solvent: methyl ethyl ketone/cyclohexanone = 1/1) | 1914.7 g |

These solutions were stirred and mixed by a disper, to prepare the magnetic substance-containing intermediate solution.

[3] Preparation of Particle-dispersed Solution (1) Preparation of Tospearl 105 Particle-dispersed Solution (Large Particles)

A dispersed solution of Tospearl 105 particles (polysiloxane spherical particles, average primary particle diameter of 0.5 μm) was prepared according to the following formulation.

| | |
|---|---|
| Tospearl 105 | 10 g |
| Diacetyl cellulose solution (solid content 3%, solvent: methly ethyl ketone/cyclohexane = 1/1) | 190 g |

A mixture of the above was dispersed while stirring for 1 hour on an ice bath by means of the ultrasonic wave homogenizer "SONIFIER 450 (manufactured by BRANSON Co., Ltd.)."

(2) Preparation of Tospearl XC99-A8808 Particles-dispersed Solution (Large Particles)

A dispersed solution of Tospearl XC99-A8808 particles (polysiloxane spherical particles, average primary particle diameter of 0.9 μm) was prepared according to the following formulation.

| | |
|---|---|
| Tospearl XC-99 | 10 g |
| Diacetyl cellulose solution (solid content 3%, solvent: methyl ethyl ketone/cyclohexanone = 1/1) | 190 g |

A mixture of the above was dispersed while stirring for 1 hour on an ice bath by means of the ultrasonic wave homogenizer "SONIFIER 450 (manufactured by BRANSON Co., Ltd.)."

(3) Preparation of Tospearl 120 Particle-dispersed Solution (Large Particles)

A dispersed solution of Tospearl 120 particles (polysiloxane spherical particles, average primary particle diameter of 2.0 μm) was prepared according to the following formulation.

| | |
|---|---|
| Tospearl 120 | 10 g |
| Diacetyl cellulose solution (solid content 3%, solvent: methyl ethyl ketone/cyclohexanone = 1/1) | 190 g |

A mixture of the above was dispersed while stirring for 1 hour on an ice bath by means of the ultrasonic wave homogenizer "SONIFIER 450 (manufactured by BRANSON Co., Ltd.)"

(4) Preparation of MX-100 Particle-dispersed Solution (Large Particles)

A dispersed solution of MX-100 particles (crosslinked PMMA spherical particles, average primary particle diameter of 1.0 μm) was prepared according to the following formulation.

| | |
|---|---|
| MX-100 | 10 g |
| Diacetyl cellulose solution (solid content 3%, solvent: methyl ethyl ketone/cyclohexanone = 1/1) | 190 g |

A mixture of the above was dispersed while stirring for 1 hour on an ice bath by means of the ultrasonic wave homogenizer "SONIFIER 450 (manufactured by BRANSON Co., Ltd.)".

(5) Preparation of MX-40 Particle-dispersed Solution (Large Particles)

A dispersed solution of MX-40 particles (crosslinked PMMA spherical particles, average primary particle diameter of 0.4 μm) was prepared according to the following formulation.

| | |
|---|---|
| MX-40 | 10 g |
| Diacetyl cellulose solution (solid content 3%, solvent: methyl ethyl ketone/cyclohexanone = 1/1) | 190 g |

A mixture of the above was dispersed while stirring for 1 hour on an ice bath by means of the ultrasonic wave homogenizer "SONIFIER 450 (manufactured by BRANSON Co., Ltd.)".

(6) Preparation of MX-30 Particle-dispersed Solution (Large Particles)

A dispersed solution of MX-30 particles (crosslinked PMMA spherical particles, average primary particle diameter of 0.3 μm) was prepared according to the following formulation.

| | |
|---|---|
| MX-30 | 10 g |
| Diacetyl cellulose solution (solid content 3%, solvent: methyl ethyl ketone/cyclohexanone = 1/1) | 190 g |

A mixture of the above was dispersed while stirring for 1 hour on an ice bath by means of the ultrasonic wave homogenizer "SONIFIER 450 (manufactured by BRANSON Co., Ltd.)".

(7) Preparation of MX-70 Particle-dispersed Solution (Large Particles)

A dispersed solution of MX-70 particles (crosslinked PMMA spherical particles, average primary particle diameter of 0.7 μm) was prepared according to the following formulation.

| | |
|---|---|
| MX-70 | 10 g |
| Diacetyl cellulose solution (solid content 3%, solvent: methyl ethyl ketone/cyclohexanone = 1/1) | 190 g |

A mixture of the above was dispersed while stirring for 1 hour on an ice bath by means of the ultrasonic wave homogenizer "SONIFIER 450 (manufactured by BRANSON Co., Ltd.)".

(8) Preparation of AKP 20 Particle-dispersed Solution (α-alumina Large Particles to be used in Combination with Resin Large Particles)

A dispersed solution of AKP 20 particles was prepared according to the following formulation.

| | |
|---|---|
| AKP 20 (average primary particle) diameter of 0.6 μm) | 10 g |
| Diacetyl cellulose solution (solid content 3%, solvent: methyl ethylketone,/cyclohexanone = 1/1) | 190 g |

A mixture of the above was dispersed while stirring for 3 hour on an ice bath by means of the ultrasonic wave homogenizer "SONIFIER 450 (manufactured by BRANSON Co., Ltd.)".

(9) Preparation of HIT 100 Particle-dispersed Solution (Fine Particles)

A mixture having the formulation shown below was finely dispersed at 2000 rpm for 12 hours by means of a sandmill (¼ G sandmill in which both the interior of the vessel and the rotary disc had been processed with ceramic coating). Zirconia beads of 1 mmΦ were used as media.

| | |
|---|---|
| HIT 100 (α-alumina, average primary particle diameter of 0.10 μm) | 37 g |
| Silane coupling agent [3-(poly(polymerization degree 10)oxyethynyl) oxypropyl trimethoxysilane] | 8.4 g |
| Diacetyl cellulose solution (solid content 4.5%., solvent: methyl ethyl ketone/cyclohexanone = 1/1) | 324.6 g |

(10) Colloidal Silica Particle-dispersed Solution (Fine Particles)

"MEK-silica sol" (trade name) manufactured by Nissan Chemical Industries Ltd. was used.

This was a dispersed solution of colloidal silica having average primary particle diameter of 0.015 μm in methyl ethyl ketone as a dispersion medium, and the solid content of the colloidal silica was 30%.

[4] Preparation of Second Layer Coating Solution
(This Invention 1-A Sample)

| The above-described magnetic substance-containing | |
|---|---|
| intermediate solution | 3500 g |
| Tospearl 105 dispersed solution | 14.7 g |
| HIT 100 dispersed solution | 147 g |
| Crosslinking agent [1]: Millionate MR-400 (manufactured by Nippon Polyurethane Co., Ltd.) | 8 g |
| Methyl ethyl ketone | 15.5 g |
| Cyclohexanone | 15.5 g |

The above-mentioned coating solution was coated in a coating amount of 29.3 cc/m² by means of a wire bar. Drying of the coated layer was performed at 110° C. At this time, Tospearl 105 was coated in a coating amount of 50 mg/m². The thickness of the dried magnetic layer was 1.0 μm, except for protuberances formed by large particles.

(3) Third Layer
[1] Preparation of Lubricant-undiluted Dispersion

The a solution, having the following formulation and dissolved by heating at 90° C., was added to the b solution, and the mixture was dispersed by means of a high-pressure homogenizer, to obtain a lubricant-undiluted dispersion.

| a solution | |
|---|---|
| The compound shown below $C_6H_{13}CH(OH)(CH_2)_{10}COOC_{50}H_{101}$ | 0.75 weight part |
| The compound shown below $n\text{-}C_{50}H_{101}O(CH_2CH_2O)_{16}H$ | 0.75 weight part |
| Xylene | 2.11 weight parts |
| Propyleneglycol-monomethyl ether | 0.08 weight part |
| b solution | |
| Cyclohexanone | 96.3 weight parts |

[2] Preparation of Third Layer Coating Solution

Solvents shown below were added to 482 g of the above-described lubricant-undiluted dispersion, to obtain a coating solution.

| | |
|---|---|
| Isopropyl alcohol | 3243 g |
| Methanol | 115 g |
| Cyclohexanone | 144 g |
| The compound shown below $C_8F_{17}SO_2N(C_3H_7)(CH_2CH_2O)_4(CH_2)_4SO_3Na$ | 0.73 g |
| Polyester modified silicone solution (manufactured by BYK Chemi Japan Co., Ltd., Trade name: BYK 310, solid content 25%) | 2.88 g |

The above-described third layer coating solution was coated on the second layer in a coating amount of 10.4 cc/m², followed by drying at 90° C.

Further, This invention Samples 1-B to 1-H, and 1-K, and Comparison Samples 1-a, 1-b, and 1-c, as illustrated in Tables 1 and 2, were prepared as follows.

(This Invention Sample 1-B)

A sample was prepared in the same manner as in This invention Sample 1-A, except that the formulation for the second layer coating solution was changed as shown below. This sample is designated as This invention Sample 1-B.

| The above-described magnetic substance-containing | |
|---|---|
| intermediate solution | 3500 g |
| Tospearl 105 dispersed solution | 147 g |
| Colloidal silica dispersed solution (solid content 30%) | 98 g |
| Crosslinking agent [1]: Millionate MR-400 (Nippon Polyurethane Co., Ltd.) | 8 g |
| Methyl ethyl ketone | 40 g |
| Cyclohexanone | 40 g |

(This Invention Sample 1-C)

A sample was prepared in the same manner as in This invention Sample 1-A, except that the formulation for the second layer coating solution was changed as shown below. This sample is designated as This invention Sample 1-C.

| The above-described magnetic substance-containing | |
|---|---|
| intermediate solution | 3500 g |
| Tospearl XC-99 dispersed solution | 147 g |
| HIT 100 dispersed solution | 147 g |
| Crosslinking agent [1]: Millionate MR-400 (Nippon Polyurethane Co., Ltd.) | 8 g |
| Methyl ethyl ketone | 15.5 g |
| Cyclohexanone | 15.5 g |

(This Invention Sample 1-D)

A sample was prepared in the same manner as in This invention Sample 1-A, except that the formulation for the second layer coating solution was changed as shown below. This sample is designated as This invention Sample 1-D.

| The above-described magnetic substance-containing | |
|---|---|
| intermediate solution | 3500 g |
| Tospearl XC-99 dispersed solution | 147 g |
| Colloidal silica dispersed solution (solid content 30%) | 98 g |
| Crosslinking agent [1]: Millionate MR-400 (Nippon Polyurethane Co., Ltd.) | 8 g |
| Methyl ethyl ketone | 40 g |
| Cyclohexanone | 40 g |

(This invention Sample 1-E)

A sample was prepared in the same manner as in This invention Sample 1-A, except that the formulation for the second layer coating solution was changed as shown below. This sample is designated as This invention Sample 1-E.

| The above-described magnetic substance-containing | |
|---|---|
| intermediate solution | 3500 g |
| MX-100 dispersed solution | 147 g |
| Colloidal silica dispersed solution (solid content 30%) | 98 g |
| Crosslinking agent [1]: Millionate MR-400 (Nippon Polyurethane Co., Ltd.) | 8 g |
| Methyl ethyl ketone | 40 g |
| Cyclohexanone | 40 g |

(This Invention Sample 1-F)

A sample was prepared in the same manner as in This invention Sample 1-A, except that the formulation for the second layer coating solution was changed as shown below. This sample is designated as This invention Sample 1-F.

| The above-described magnetic substance-containing | |
|---|---|
| intermediate solution | 3500 g |
| MX-100 dispersed solution | 118 g |
| AKP 20 dispersed solution | 29 g |
| Colloidal silica dispersed solution (solid content 30%) | 98 g |
| Crosslinking agent [1]: Millionate MR-400 (Nippon Polyurethane Co., Ltd.) | 8 g |
| Methyl ethyl ketone | 40 g |
| Cyclohexanone | 40 g |

(Comparative Sample 1-a)

A sample was prepared in the same manner as in This invention Sample 1-A, except that the formulation for the second layer coating solution was changed by the following, and the thickness of the coating was changed to about 1.2 μm.

| Diacetyl cellulose (binder) | 1500 g |
|---|---|
| Triacetyl cellulose (binder) | 129 g |
| Toda CSF-4085 V2 (magnetic particles) | 129 g |
| Sumitomo AKP-50 (alumina, 0.25 μm) | 35 g |
| Degussa Aluminum oxide C (0.04 μm) | 135 g |
| Gafac PE510 (surfactant) | 6 g |
| Gafac PE610 (surfactant) | 3 g |
| Solsperse 24000 (dispersant) | 375 g |
| Dibutyl phtharate (grinding solvent) | 267 g |
| 3M FC-431 (coating aid) | 136 g |
| Mobay Mondur CB 75 (crosslinking agent) | 15 g |
| Tin octyate (crosslinking catalyst) | 270 g |
| Methylene chloride (solvent) | 66428 g |
| Acetone (solvent) | 23724 g |
| Methyl acetoacetate (solvent) | 5655 g |

(Example Sample 1-J)

A sample was prepared in the same manner as in Example Sample 1-A, except that formulations for the second layer coating solution and the third layer coating solution were each changed as follows. This samples is designated as Example Sample 1-J.

Second Layer Coating Solution

| The above-described magnetic substance-containing | |
|---|---|
| intermediate soiution | 3500 g |
| AKP 20 dispersed solution | 29 g |
| Colloidal silica dispersed solution | 98 g |
| Crosslinking agent [1]: Millionate MR-400 (manufactured by Nippon Polyurethane Co., Ltd.) | 8 g |
| Methyl ethyl ketone | 15.5 g |
| Cyclohexanone | 15.5 g |

A mixture having the following formulation was dispersed for 1 hr. by means of an ultrasonic homogenizer, to prepare a PMMA dispersed solution.

| Crosslinked PMMA particles (0.5 μm) | 10 g |
|---|---|
| Solsperse 24000 (dispersing agent) | 4 g |
| Methyl ethyl ketone | 93 g |
| Cyclohexanone | 93 g |

Third Layer Coating Solution

| Lubricant-undiluted dispersion | 482 g |
|---|---|
| The above-described PMMA dispersed solution | 145 g |
| Isopropyl alcohol | 3243 g |
| Methanol | 115 g |
| The compound shown below $C_8F_{17}SO_2N(C_3H_7)(CH_2CH_2O)_4(CH_2)_4SO_3Na$ | 0.73 g |
| Polyester modified silicone solution (manufactured by BYK Chemi Japan, Co. Ltd., trade name BYK 310, solid content of 25%) | 2.88 g |

(This Invention Sample 1-G)

A sample was prepared in the same manner as in This invention Sample 1-C, except that the second layer coating solution was coated in a coating amount of 17.3 cc/m$^2$ (dry thickness 0.7 μm). This sample is designated as This invention Sample 1-G.

(This Invention Sample 1-H)

A sample was prepared in the same manner as in This invention Sample 1-F, except that the second layer coating solution was coated in a coating amount of 17.3 cc/m$^2$ (dry thickness 0.7 μm). This sample is designated as This invention Sample 1-H.

(This Invention Sample 1-K)

A sample was prepared in the same manner as in This invention Sample 1-E, except that MX-100 dispersed solution in the second layer coating solution was changed to MX-70 dispersed solution. This sample is designated as This invention Sample 1-K.

(Comparative Sample 1-b)

A sample was prepared in the same manner as in This invention Sample 1-E, except that MX-100 dispersed solution in the second layer coating solution was changed to MX-40 dispersed solution. This sample is designated as Comparative Sample 1-b.

(Comparative Sample 1-c)

A sample was prepared in the same manner as in This invention Sample 1-E, except that MX-100 dispersed solution in the second layer coating solution was changed to MX-30 dispersed solution. This sample is designated as Comparative Sample 1-c.

(This Invention Sample 2-A)

A sample was prepared in the same manner as in This invention Sample 1-A, except that the second layer coating solution was changed to the coating solution having the formulation shown below, and that an interlayer having the formulation shown below was additionally coated between the second layer and the third layer. This sample is designated as This invention Sample 2-A.

SEM photographs enlarged 10,000 times the surface of each sample according to the present invention including This invention Sample 2-A, for shape observation, were taken. As a result, it was identified that the large/small protuberances having a desired height were satisfactorily formed on the surface at a desired density of protuberances.

<Formulation of Second Layer Coating Solution>

| The above-described magnetic substance-containing | |
|---|---|
| intermediate solution | 3500 g |
| Diacetyl cellulose solution (solid content 4.5%, solvent: methyl ethyl ketone/cyclohexanone = 1/1) | 294 g |
| Crosslinking agent [1]: Millionate MR-400 | 8 g |

-continued

| | |
|---|---|
| The above-described magnetic substance-containing | |
| (manufactured by Nippon Polyurethane Co., Ltd.) | |
| Methyl ethyl ketone | 15.5 g |
| Cyclohexanone | 15.5 g |

<Formulation of Interlayer Coating Solution>

| | |
|---|---|
| Diacetyl cellulose solution | 52 g |
| (solid content 4.5%, solvent: methyl ethyl ketone/ | |
| cyclohexanone = 1/1) | |
| Methyl ethyl ketone | 1166 g |
| Cyclohexanone | 1166 g |
| Tospearl 105 dispersed solution | 108 g |
| Colloidal silica dispersed solution | |
| (solid content 30%) | 9 g |

The above-described coating solution was coated in a coating amount of 10.4 cc/m² by means of a wire bar. Drying was carried out at 110° C. At this time, Tospearl 105 was coated in a coating amount of 20 mg/m².

(This Invention Sample 2-B)

A sample was prepared in the same manner as in This invention Sample 2-A, except that the interlayer coating solution was changed to the coating solution having the formulation shown below. This sample is designated as This invention Sample 2-B.

<Formulation of Interlayer Coating Solution>

| | |
|---|---|
| Diacetyl cellulose solution | 52 g |
| (solid content 4.5%, solvent: methyl ethyl ketone/ | |
| cyclohexanone = 1/1) | |
| Methyl ethyl ketone | 1166 g |
| Cyclohexanone | 1166 g |
| Tospearl 105 dispersed solution | 108 g |
| HIT 100 dispersed solution | 27 g |
| (particle content 10%) | |

(This Invention Sample 2-C)

A sample was prepared in the same manner as in This invention Sample 2-A, except that the interlayer coating solution was changed to the coating solution having the formulation shown below. This sample is designated as This invention Sample 2-C.

<Formulation of Interlayer Coating Solution>

| | |
|---|---|
| Diacetyl cellulose solution | 52 g |
| (solid content 4.5%, solvent: methyl ethyl ketone/ | |
| cyclohexanone = 1/1) | |
| Methyl ethyl ketone | 1166 g |
| Cyclohexanone | 1166 g |
| Tospearl 105 dispersed solution | 108 g |
| AKP 20 dispersed solution | 11 g |
| Colloidal silica dispersed solution | 9 g |
| (solid content 30%) | |

(This Invention Sample 2-D)

A sample was prepared in the same manner as in This invention Sample 2-A, except that the second layer coating solution was changed to the coating solution having the formulation shown below. This sample is designated as This invention Sample 2-D.

<Formulation of Second Layer Coating Solution>

| | |
|---|---|
| The above-described magnetic substance-containing | |
| intermediate solution | 3500 g |
| Diacetyl cellulose solution | 147 g |
| (solid content 4.5%, solvent: methyl ethyl | |
| ketone/cyclohexanone = 1/1) | |
| Crosslinking agent [1]: Millionate MR-400 | 8 g |
| (manufactured by Nippon Polyurethane Co., Ltd.) | |
| Colloidal silica dispersed solution | 98 g |
| (solid content 30%) | |
| Methyl ethyl ketone | 40 g |
| Cyclohexanone | 40 g |

(This Invention Sample 2-E)

A sample was prepared in the same manner as in This invention Sample 2-A, except that the second layer coating solution was changed to the coating solution having the formulation shown below. This sample is designated as This invention Sample 2-E.

<Formulation of Second Layer Coating Solution>

| | |
|---|---|
| The above-described magnetic substance-containing | |
| intermediate solution | 3500 g |
| Diacetyl cellulose solution | 147 g |
| (solid content 4.5%, solvent: methyl ethyl | |
| ketone/cyclohexanone = 1/1) | |
| Crosslinking agent [1]: Millionate MR-400 | 8 g |
| (manufactured by Nippon Polyurethane Co., Ltd.) | |
| AKP 20 dispersed solution | 59 g |
| (particle content 5%) | |
| Methyl ethyl ketone | 40 g |
| Cyclohexanone | 40 g |

(This Invention Sample 2-F)

A sample was prepared in the same manner as in This invention Sample 2-E, except that the interlayer coating solution and the third layer coating solution were respectively changed to the coating solutions having the formulation shown below. This sample is designated as This invention Sample 2-F.

<Formulation of Interlayer Coating Solution>

| | |
|---|---|
| Diacetyl cellulose solution | 52 g |
| (solid content 4.5%, solvent: methyl ethyl ketone/ | |
| cyclohexanone = 1/1) | |
| Methyl ethyl ketone | 1166 g |
| Cyclohexanone | 1166 g |
| Tospearl 105 dispersed solution | 108 g |

<Third Layer>

[1] Preparation of Lubricant-undiluted Dispersion

The a solution, having the following formulation and dissolved by heating at 90° C., was added to the b solution, and the mixture was dispersed by means of a high-pressure homogenizer, to obtain a lubricant-undiluted dispersion.

| | |
|---|---|
| a solution | |
| The compound shown below | 0.75 weight part |
| $C_6H_{13}CH(OH)(CH_2)_{10}COOC_{50}H_{101}$ | |
| The compound shown below | 0.75 weight part |

-continued

| | |
|---|---|
| n-$C_{50}H_{101}O(CH_2CH_2O)_{16}H$ | |
| Xylene | 2.11 weight parts |
| Propyleneglycol-monomethyl ether | 0.08 weight part |
| b solution | |
| Cyclohexanone | 96.3 weight parts |

[2] Preparation of Third Layer Coating Solution

Solvents shown below were added to 482 g of the above-described lubricant-undiluted dispersion, to obtain a coating solution.

| | |
|---|---|
| Isopropyl alcohol | 3081 g |
| Methanol | 115 g |
| The compound shown below | 0.73 g |
| $C_8F_{17}SO_2N(C_3H_7)(CH_2CH_2O)_4(CH_2)_4SO_3Na$ | |
| Polyester modified silicone solution | 2.88 g |
| (manufactured by BYK Chemi Japan. Co., Ltd., | |
| Trade name: BYK 310, solid content 25%) | |
| Colloidal silica dispersed solution | |
| (solid content 30%) | 113 g |

(Comparative Sample 2-a)

A sample was prepared in the same manner as in This invention Sample 2-A, except that the interlayer coating solution was changed to the coating solution having the formulation shown below. This sample is designated as Comparative Sample 2-a.

<Formulation of Interlayer Coating Solution>

| | |
|---|---|
| Diacetyl cellulose solution | 52 g |
| (solid content 4.5%, solvent: methyl ethyl ketone/ | |
| cyclohexanone = 1/1) | |
| Methyl ethyl ketone | 1066 g |
| Cyclohexanone | 1066 g |
| Tospearl 105 dispersed solution | 108 g |

(Comparative Sample 2-b)

A sample was prepared in the same manner as in This invention Sample 2-A, except that the interlayer coating solution was changed to the coating solution having the formulation shown below. This sample is designated as Comparative Sample 2-b.

<Formulation of Interlayer Coating Solution>

| | |
|---|---|
| Diacetyl cellulose solution | 52 g |
| (solid content 4.5%, solvent: methyl ethyl ketone/ | |
| cyclohexanone = 1/1) | |
| Methyl ethyl ketone | 1120 g |
| Cyclohexanone | 1120 g |
| Colloidal silica 105 dispersed solution | 9 g |

Evaluation of the thus-prepared samples is described below.

a) Measurement of the Number and Height of Protuberances

The height of protuberances was measured using an AFM "Nanoscope III," manufactured by Desital Instruments Co.

The number of surface protuberances, and the approximate height thereof, were measured using a low accelerator SEM "S 900," manufactured by Hitachi, Ltd.

The number of protuberances was obtained by counting the number in the visual field, and then taking an average.

a) Measurement of the Degree of Haze

With respective to the sample prior to the step of coating a light-sensitive silver halide emulsion layer, but after a subbing layer was removed, the degree of haze was measured using a haze meter "VGS-1001DP," manufactured by NIPPON DENSHOKU KOGYO Co. At this time, the measurement was carried out such that the direction of light incidence was from the side of the transparent magnetic recording layer. According to the following equation for the degree of haze, samples were classified into two grades:

| Sample | Grade |
|---|---|
| The degree of haze of the transparent magnetic recording medium was less than 9% | ○ |
| The degree of haze of the transparent magnetic recording medium was not less than 9% | X (N.G.) |
| T = D + PT | PT: Parallel transmittance |
| H = (D/T) × 100 (%) | T: Total transmittance |
| | D: Diffusion |
| | H: The degree of haze |
| | (turbidity) | b) Measurement of Particle Diameter of Particles Dispersed in a Coating Layer

In order to measure the particle size (average secondary particle diameter) of inorganic or organic high-molecular particles dispersed in a coating layer of the prepared sample, the procedure shown below was followed.

[1] A binder that covered the particles was removed using a low-temperature ashing device (Plasmareactor PR-503, manufactured by YAMATO SCIENTIFIC Co., Ltd.)

[2] After the binder covering the surface of the particles had been removed, required sheets of photographs were taken of the surface of the sample, using a scanning-type electron microscope "ESX-3200," at 5000 to 10,000 magnifications.

[3] The circle-equivalent diameter was measured by a desitizer, with respect to each of the dispersed particles photographed in the preceding step, and thereby an average circle-equivalent diameter of a total of 500 particles was calculated.

[4] The above-described average circle-equivalent diameter was designated as the size (particle diameter) of particles dispersed in a coating layer.

c) Evaluation of Magnetic Input/output Capacity

A wide-width film thus prepared was slitted to 24 mm-width films, and the resultant films were encased in cartridges, to obtain 40 shot films for an APS camera. The thus-obtained films were exposed to light by an APS camera "EPION 300," manufactured by FUJI PHOTO OPTICAL Co., Ltd., and photographing conditions at that time were recorded by magnetic force in a magnetic recording layer. After that, the exposed films were subjected to development processing using N4 solution of electric conductivity 2000 $\mu Scm^{-1}$, according to the CN-16X Chemical formulation, manufactured by Fuji Photo Film Co. Ltd. A processing machine for motion picture film, FNCP-900, manufactured by Fuji Photo Film Co., Ltd., was used. These processing conditions are those at which the density of a processing solution is higher than usual, and thereby the adhesion amount of the processing solution to the surface of a film is increased. The processed samples were rolled in cartridges using an attacher "AT-100," manufactured by Fuji Film Co., Ltd. Subsequently, 50 rolls of the films were successively read at an ordinary temperature and humidity using a negacarrier "NC 240S," manufactured by Fuji Photo Film Co., Ltd., to evaluate magnetic capacity. The above-described conditions for evaluation were used, because stain (deposit) comprising, as a primary element, a dried-up solid substance of a processing solution in development remaining on the surface of a transparent magnetic recording layer, is transferred and then accumulates onto a magnetic head surface during running of the samples, and consequently the output of a magnetic signal is lowered by a space loss, whereby a magnetic reading error is caused. The situation wherein the reduction of reproduction output is 35% based on the ideal reproduction output (the situation wherein the magnetic head is free from stain) is defined as the output reduction (magnetic error).

| | | |
|---|---|---|
| Output reduction did not occur up ta 50 rolls | : | ○ |
| Output reduction occurred at 40 rolls | : | ○Δ |
| Output reduction occurred at 30 rolls | : | Δ |
| Output reduction occurred at 20 rolls | : | X |
| Output reduction occurred at not more than 10 rolls | : | XX |

Further, stain of the head after 50 rolls running was observed.

| | | |
|---|---|---|
| Almost nothing | : | ○ |
| Slightly present | : | ○Δ |
| Present | : | Δ |
| Much | : | X |
| Very much | : | XX |

The stain was found to be as illustrated above.

d) Measurement of Fractional Contact Area

The fractional contact area was measured using a microtopograph, manufactured by TOYO SEIKI SEISAKU-SHO, Ltd. The measurement was carried out at the conditions of 25° C., 60% RH; load, 16 kgf/cm$^2$; and measurement wavelength, 0.5 μm. In this measurement, when the surface of a sample is optically smooth, the value of the fractional contact area is 100%. As the surface of a sample is less smooth, the value decreases.

TABLE 1

| | | Second layer | | | Third layer | | |
|---|---|---|---|---|---|---|---|
| Sample | Particles | Average primary particle diameter μm | Coating amount mg/m$^2$ | Coating thickness μm | Particles | Average primary particle diameter μm | Coating amount mg/m$^2$ |
| This invention 1-A | Siloxane<br>α-alumina | 0.5<br>0.1 | 50<br>100 | 1.0 | none | | |
| This invention 1-B | Siloxane<br>Colloidal silica | 0.5<br>0.015 | 50<br>200 | 1.0 | none | | |
| This invention 1-C | Siloxane<br>α-alumina | 0.9<br>0.1 | 50<br>100 | 1.0 | none | | |
| This invention 1-D | Siloxane<br>Colloidal silica | 0.9<br>0.015 | 50<br>200 | 1.0 | none | | |
| This invention 1-E | PMMA<br>Colloidal silica | 1.0<br>0.015 | 50<br>200 | 1.0 | none | | |
| This invention 1-F | PMMA<br>α-alumina<br>Colloidal silica | 1.0<br>0.6<br>0.015 | 50<br>10<br>200 | 1.0 | none | | |
| Comparison 1-a | AKP-50<br>Degussa aluminum oxide C | 0.25<br>0.04 | 35<br>135 | 1.2 | none | | |
| This invention 1-J | AKP-20<br>Colloidal silica | 0.6<br>0.015 | 10<br>200 | 1.0 | PMMA | 0.5 | 15 |
| This invention 1-G | Siloxane<br>α-alumina | 0.9<br>0.1 | 35<br>140 | 0.7 | none | | |
| This invention 1-H | PMMA<br>α-alumina<br>Colloidal silica | 1.0<br>0.6<br>0.015 | 35<br>7<br>140 | 0.7 | none | | |
| This invention 1-K | PMMA<br>Colloidal silica | 0.7<br>0.015 | 50<br>200 | 1.0 | none | | |
| Comparison 1-b | PMMA<br>Colloidal silica | 0.4<br>0.015 | 50<br>200 | 1.0 | none | | |
| Comparison 1-c | PMMA<br>Colloidal silica | 0.3<br>0.015 | 50<br>200 | 1.0 | none | | |

| Sample | Number of small protuberance pieces/100 μm$^2$ | Number of large protuberance piece/100 μm$^2$ | Fractional contact area % | Degree of haze | Head staining | Magnetic capacity |
|---|---|---|---|---|---|---|
| This invention 1-A | c.a. 500 | 26 | 61 | ○ | ○Δ | ○ |
| This invention 1-B | c.a. 20,000 | 25 | 63 | ○ | ○Δ | ○ |
| This invention 1-C | c.a. 500 | 5 | 55 | ○ | ○Δ | ○ |
| This invention 1-D | c.a. 20,000 | 5 | 52 | ○ | ○Δ | ○ |
| This invention 1-E | c.a. 20,000 | 4 | 54 | ○ | ○Δ | ○ |
| This invention 1-F | c.a. 20,000 | 5 | 57 | ○ | ○Δ | ○ |
| Comparison 1-a | c.a. 5,000 | 0 | 98 | ○ | X | X |
| This invention 1-J | c.a. 20,000 | 12 | 54 | ○ | ○ | ○ |

TABLE 1-continued

| | | | | | | |
|---|---|---|---|---|---|---|
| This invention 1-G | c.a. 20,000 | 5 | 58 | ○ | ○ | ○ |
| This invention 1-H | c.a. 20,000 | 6 | 59 | ○ | ○ | ○ |
| This invention 1-K | c.a. 20,000 | 10 | 57 | ○ | ○△ | ○ |
| Comparison 1-b | c.a. 20,000 | 0.5 | 83 | ○ | X | X |
| Comparison 1-c | c.a. 20,000 | 0 | 88 | ○ | X | X |

Note:
Small protuberance: protuberance of a height of 0.005 μm or higher, but lower than 0.1 μm
Large protuberance: protuberance of a height of 0.1 μm or higher, but 0.5 μm or lower As is apparent from the results shown in Table 1, this invention samples showed marked improvement effects in magnetic input/output capacity, and therefore the present invention can provide a transparent magnetic recording medium that is excellent in both assured magnetic input/output capacity and transparency.

Particularly, Samples 1-G and 1-H, in which the coating thickness was not more than 90% of the diameter of the large particles, could further reduce stain of the head.

As a result, the same improvement effects (results) were obtained. By this alteration, a transparent magnetic recording medium having a light-sensitive silver halide emulsion layer, that has further improved slipping (sliding) property, and that excels in both transparency and magnetic input/output capacity, could be obtained.

(Others—This Invention Samples—Part 2)

Samples were prepared in the same manner as in the above-described this invention samples, except that the

TABLE 2

| | Second layer | | | Interlayer | | | Third layer | | |
|---|---|---|---|---|---|---|---|---|---|
| Sample | Particles | Average primary particle diameter μm | Coating amount mg/m² | Particles | Average primary particle diameter μm | Coating amount mg/m² | Particles | Average primary particle diameter μm | Coating amount mg/m² |
| This invention 2-A | none | | | Siloxane | 0.5 | 20 | none | | |
| | | | | Colloidal silica | 0.015 | 10 | | | |
| This invention 2-B | none | | | Siloxane | 0.5 | 20 | none | | |
| | | | | α-alumina | 0.1 | 10 | | | |
| This invention 2-C | none | | | Siloxane | 0.5 | 20 | none | | |
| | | | | α-alumina | 0.6 | 2 | | | |
| | | | | Colloidal silica | 0.015 | 10 | | | |
| This invention 2-D | Colloidal silica | 0.015 | 200 | Siloxane | 0.5 | 20 | none | | |
| | | | | Colloidal silica | 0.015 | 10 | | | |
| This invention 2-E | α-alumina | 0.6 | 20 | Siloxane | 0.5 | 20 | none | | |
| | | | | Colloidal silica | 0.015 | 10 | | | |
| This invention 2-F | α-alumina | 0.6 | 20 | Siloxane | 0.5 | 20 | Colloidal silica | 0.015 | 10 |
| Comparison 2-a | none | | | Siloxane | 0.5 | 20 | none | | |
| Comparison 2-b | none | | | Colloidal silica | 0.015 | 10 | none | | |

| Sample | Number of small protuberance pieces/100 μm² | Number of large protuberance piece/100 μm² | Fractional contact area % | Degree of haze | Head staining | Magnetic capacity |
|---|---|---|---|---|---|---|
| This invention 2-A | c.a. 5,000 | 12 | 64 | ○ | ○ | ○ |
| This invention 2-B | c.a. 5,000 | 12 | 66 | ○ | ○△ | ○ |
| This invention 2-C | c.a. 5,000 | 13 | 63 | ○ | ○△ | ○ |
| This invention 2-D | c.a. 20,000 | 12 | 66 | ○ | ○△ | ○ |
| This invention 2-E | c.a. 5,000 | 20 | 58 | ○ | ○ | ○ |
| This invention 2-F | c.a. 10,000 | 20 | 61 | ○ | ○△ | ○ |
| Comparison 2-a | none | 12 | 63 | ○ | △ | △ |
| Comparison 2-b | c.a. 5,000 | none | 98 | ○ | X | X |

As is apparent from the results shown in Table 2, this invention samples showed marked improvement effects in magnetic input/output capacity, and therefore the present invention can provide a transparent magnetic recording medium that is excellent in both assured magnetic input/output capacity and transparency.

(Others—This Invention Samples—Part 1)

Samples were prepared in the same manner as in all of the above-described this invention samples, except that the solid contents incorporated in the third coated layer were changed to twice that of the above-described this invention samples.

coating amount of a magnetic substance incorporated in the second layer was changed to 0.6 times as much as the original one, and that the light-sensitive emulsion layer was changed to the reversal color emulsion layer of Sample 1 in Example 1 described in JP-A-2-854. Further, the thus-prepared samples were subjected to development processing for a color reversal photographic light-sensitive material as shown in Example 1 of JP-A-2-854, instead of the above-described processing. As a result, the same improvement effects (results) were obtained, and thereby a transparent magnetic recording medium incorporating therein a silver halide emulsion layer, excellent in both transparency and magnetic input/output capacity, was obtained.

Having described our invention as related to the present embodiments, it is our intention that the invention not be limited by any of the details of the description, unless otherwise specified, but rather be construed broadly within its spirit and scope as set out in the accompanying claims.

What we claim is:

1. A transparent magnetic recording medium having, on a support, at least one magnetic recording layer containing magnetic particles, which medium comprises a first set of protuberances having a height of 0.001 μm or more than 0.001 μm, but less than 0.1 μm, and a density of from $1 \times 10^2$ pieces/100 μm$^2$ to $1 \times 10^5$ pieces/100 μm$^2$, and a second set of protuberances having a height of from 0.1 μm to 0.5 μm, and a density of from 1 piece/100 μm$^2$ to 200 pieces/100 μm$^2$, on a surface that is at the side of said at least one magnetic recording layer provided, wherein the difference of height between the first set of protuberances and the second set of protuberances is 0.1 μm or more but 1.0 μm or less; and said medium contains at least first and second kinds of inorganic particles and/or organic high-molecular particles, each of which has different average primary particle diameters, in at least the magnetic recording layer or an outer layer positioned such that the magnetic recording layer lies between said outer layer and said support, the average primary particle diameter of the first kind of the inorganic particles and/or organic high-molecular particles used to obtain the second set of protuberances being more than 0.4 μm, but 1.5 μm or less.

2. The transparent magnetic recording medium as claimed in claim 1, wherein the average primary particle diameter of the first kind of the inorganic particles and/or organic high-molecular particles is 0.7 μm or more, but 1.5 μm or less.

3. The transparent magnetic recording medium as claimed in claim 1, wherein the average primary particle diameter of the second kind of the inorganic particles and/or organic high-molecular particles used to obtain the first set of protuberances is from 0.01 μm to 0.2 μm.

4. The transparent magnetic recording medium as claimed in claim 3, wherein the thickness of the layer containing the inorganic particles and/or organic high-molecular particles is 50% or more, but 90% or less of the average particle diameter of the first kind of particles.

5. The transparent magnetic recording medium as claimed in claim 3, wherein the second kind of inorganic particles and/or organic high-molecular particles are α-alumina, γ-alumina, θ-alumina, silica, colloidal silica, poly(methyl methacrylate), or polystyrene.

6. The transparent magnetic recording medium as claimed in claim 5, further comprising α-alumina particles having an average primary particle size of 0.5 μm to 1.0 μm as an abrasive.

7. The transparent magnetic recording medium as claimed in claim 3, wherein the average primary particle diameter of the second kind of inorganic particles and/or organic high-molecular particles is from 0.01 μm to 0.1 μm.

8. The transparent magnetic recording medium as claimed in claim 7, wherein the second kind of inorganic particles and/or organic high-molecular particles are α-alumina or colloidal silica.

9. The transparent magnetic recording medium as claimed in claim 7, wherein the average primary particle diameter of the second kind of inorganic particles and/or organic high-molecular particles is from 0.01 to not more than 0.03 μm.

10. The transparent magnetic recording medium as claimed in claim 3, wherein the first kind of inorganic particles and/or organic high-molecular particles are spherical organic high-molecular particles.

11. The transparent magnetic recording medium as claimed in claim 10, wherein the layer containing the inorganic particles and/or organic high-molecular particles is a transparent matte layer superimposed on the magnetic layer.

12. The transparent magnetic recording medium as claimed in claim 11, wherein the transparent matte layer contains inorganic particles and/or organic high-molecular particles in an amount of $1 \times 10^{-12}$ mg/μm$^3$ to $3 \times 10^{-10}$ mg/μm$^3$.

13. The transparent magnetic recording medium as claimed in claim 1, wherein the amount of the second kind of inorganic particles and/or organic high-molecular particles to be added is from 50 mg/m$^2$ to 300 mg/m$^2$ when the first and second kinds of inorganic particles and/or organic high-molecular particles are incorporated only in the magnetic recording layer, based on a thickness of 1.0 μm.

14. The transparent magnetic recording medium as claimed in claim 13, wherein the amount of the first kind of inorganic particles and/or organic high-molecular particles to be added is from 5 mg/m$^2$ to 50 mg/m$^2$, based on a thickness of 1.0 μm.

15. The transparent magnetic recording medium as claimed in claim 1, wherein the transparent magnetic recording medium has a fractional contact area of not more than 70%, at 25° C., 60% RH, under a load of 16 kgf/cm$^2$, at the wavelength of 0.5 μm.

16. The transparent magnetic recording medium as claimed in claim 1, wherein a difference in height between the first and second sets of protuberances is from 0.3 μm to 1.0 μm.

17. The transparent magnetic recording medium as claimed in claim 1, wherein the first kind of inorganic particles and/or organic high-molecular particles are silica, polysiloxane particles, methacryl resin particles, or melamine resin particles.

18. The transparent magnetic recording medium as claimed in claim 1, wherein the average primary particle diameter of the first kind of inorganic particles and/or organic high-molecular particles is from 0.5 μm to 1.5 μm.

19. A silver halide photographic light-sensitive material, which has at least one light-sensitive silver halide emulsion layer on one side of a support and a transparent magnetic recording layer on an opposite side of the support, wherein the silver halide photographic light-sensitive material comprises a first set of protuberances having a height of 0.001 μm or more than 0.001 μm, but less than 0.1 μm, and a density of from $1 \times 10^2$ pieces/100 μm$^2$ to $1 \times 10^5$ pieces/100 μm$^2$, and a second set of protuberances having a height of from 0.1 μm to 0.5 μm, and a density of from 1 piece/100 μm$^2$ to 200 pieces/100 μm$^2$, on a surface at the side of said at least one magnetic recording layer provided, wherein the difference of height between the first set of protuberances and the second set of protuberances is 0.1 μm or more but 1.0 μm or less; and said silver halide photographic light-sensitive material contains at least first and second kinds of inorganic particles and/or organic high-molecular particles, each of which has different average primary particle diameters, in at least the magnetic recording layer or an outer layer positioned such that the magnetic recording layer lies between said outer layer and said support, and the average primary particle diameter of the first kind of the inorganic particles and/or organic high-molecular particles used to obtain the second set of protuberances is more than 0.4 μm, but 1.5 μm or less.

20. The silver halide photographic light-sensitive material as claimed in claim 19, wherein the average primary particle diameter of the first kind of the inorganic particles and/or organic high-molecular particles is 0.7 μm or more, but 1.5 μm or less.

21. The silver halide photographic light-sensitive material as claimed in claim 20, wherein the silver halide photographic light-sensitive material has a fractional contact area of not more than 70%, at 25° C., 60% RH, under a load of 16 kgf/cm², at the wavelength of 0.5 μm.

22. The silver halide photographic light-sensitive material as claimed in claim 19, wherein the average primary particle diameter of the second kind of the inorganic particles and/or organic high-molecular particles is from 0.01 μm to 0.2 μm.

* * * * *